United States Patent [19]

Rayborn

[11] 4,063,603

[45] Dec. 20, 1977

[54] DRILLING FLUID LUBRICANT

[76] Inventor: Jerry J. Rayborn, 2101 Holiday Drive, New Orleans, La. 70114

[21] Appl. No.: 770,590

[22] Filed: Feb. 22, 1977

Related U.S. Application Data

[63] Continuation-in-part of Ser. No. 719,944, Sept. 2, 1976.

[51] Int. Cl.$^2$ .............................................. E21B 7/00
[52] U.S. Cl. ................. 175/65; 252/8.5 R; 8.5 B; 8.5 C
[58] Field of Search ............. 252/8.5 B, 8.5 C, 8.5 R, 252/8.55 R; 175/65

[56] References Cited

U.S. PATENT DOCUMENTS

| | | | |
|---|---|---|---|
| 2,943,679 | 7/1960 | Scott, Jr. et al. | 252/8.5 LC |
| 3,155,162 | 11/1964 | Flickinger | 252/8.5 B |
| 3,216,933 | 11/1965 | Park et al. | 252/8.5 B |
| 3,485,753 | 12/1969 | Allais | 252/8.5 B |
| 3,575,858 | 4/1971 | Adair | 252/8.5 B |
| 3,700,050 | 10/1972 | Miles | 175/65 |
| 3,811,509 | 5/1974 | Priebe | 175/65 |

*Primary Examiner*—James A. Leppink

[57] ABSTRACT

A method wherein spherical plastic beads are added to a drilling mud to reduce torque and drag on the drill string and to otherwise enable smooth drilling operations downhole by acting as a lubricant between the drill string, drill bit, and the well bore by reducing friction therebetween.

9 Claims, No Drawings

DRILLING FLUID LUBRICANT

BACKGROUND OF THE INVENTION

This application is a continuation-in-part of my copending application Ser. No. 719,944 filed Sept. 2, 1976.

FIELD OF THE INVENTION

This invention relates to a new and improved method for reducing troque, drag, and wear on casing and drill strings used in the drilling of an oil well. There are other important features relating thereto, some of which are set forth more fully hereinbelow in the specification.

DESCRIPTION OF THE PRIOR ART

It is suggested in U.S. Pat. No. 3,216,933 that hard particulate materials be employed in drilling fluid to prevent sticking of drill pipe. The examples given of such materials are steel shot, aluminum shot, sand, walnut shells, plastic and the like. Steel and aluminum shot have relatively high specific gravities and will tend to settle out in muds of normal weight. This can be particularly troublesome when circulation ceases for one reason or another because there is then the possibility that the shot will settle out of the mud in the drill string into the bit. In certain cases, this can result in plugging of the bit. U.S. Pat. No. 2,943,679 suggests the use of walnut shells and hard plastics in a drilling fluid for decreasing the frictional drag on a drilling string. However, in both patents, these particulate materials are described as being "ground" and hence are necessarily irregular in shape.

SUMMARY OF THE INVENTION

Briefly, the present invention relates to a new and improved method in the use of plastic beads or spheres in a well to reduce the friction in the well bore occurring between the rotating drill string and drill bit and the sides fo the well bore and/or well bore casing adjacent thereto.

DESCRIPTION OF THE PREFERRED EMBODIMENT

A drilling mud is a mixture of water, clays, and various treating agents which control the physical or rheological properties of the drilling mud in a well bore.

In the drilling of a well, the obvious objective is to normally produce hydrocarbons, water, or the like and the drilling mud serves the function of removing the chips or cuttings, which are produced by the rotating drill bit, from the well bore by circulating drilling mud down from the surface of the well through the drill string and out through openings in the drill bit such that the drilling mud is then circulated upwardly in the annulus between the side of the well bore and the rotating drill string.

One of the objectives of a drilling mud is to reduce friction or provide a lubricating medium for the drill bit and the drill pipe to work in while drilling the well bore.

Friction is normally defined as a relative resistance to motion of touching surfaces. In the drilling of well bores, friction must be overcome by lubricating and thus enabling the surfaces which are creating undesirable friction to appropriately more or glide over one another. Some materials which are presently being considered as lubricating materials for use with drilling mud to help in reducing friction are water, diesel oil, vegetable oil, detergents, bentonite clays, alcohols, gilsonite, asphaltic materials, cellulose materials, polymers, dextrose materials, glycerins and amines.

Applicant has found that the addition of plastic beads, of the character more fully described below, to a drilling mud substantially reduces the friction between the drill bit, drill string and the well bore. Thus, according to applicant's method, the drill string is rotated to cut a bore hole into the earth while circulating a drilling fluid down through the drill string and thence up to the annulus between the drill string and the wall of the hole. While this is occurring, the torque required to rotate the drill string is observed and when the torque becomes undesirably high, sufficient of the plastic beads are added to reduce the torque.

In many instances, the optimum amount of plastic beads will be determined in the field on a well to well basis. Thus, if a driller observes that the torque is increasing to an undesirably high level, he can begin adding beads until the torque is reduced to a level which is acceptable to him. Normally, a minimum addition and maintenance of four pounds per barrel (1.5 percent by volume) of the beads in the mud will be required to cause a substantial reduction in torque. Adding and maintaining amounts greater than four pounds per barrel will, in many cases, affect a further reduction in torque. The maximum amount which can be added or maintained is dependent upon economics in that, for any given well, the cost of adding additional beads is not justified by the further reduction in torque.

It will be appreciated that the concentration of beads in the mud cake may be higher than that added to or maintained in the mud inasmuch as the beads tend to concentrate in the mud cake. One laboratory test has indicated that effective torque reduction is accomplished only after a bead concentration in the mud cake has exceeded an equivalent of 30 pounds per barrel. Also, in this particular instance, additions beyond an equivalent of 40 pounds per barrel does not materially reduce the torque. When a well being drilled without the beads being present encounters excessive torque, the well can be "slug" treated, as by adding 10 pounds per barrel of the beads, to rapidly reduce the torque and then the lowered torque can be maintained by maintaining about 4 pounds per barrel of beads in the mud while drilling ahead.

The size of the beads can vary over a substantial range such as from 10 to 100 mesh (Tyler standard screen size). A preferred range is 40 to 60 mesh. The preferred bead is one that is available commercailly and consists of a copolymer of divinyl benzene and styrene. These beads exist in the size range of 10 to 100 mesh. The maximum size of the bead should be such that the beads will pass through the shale shaker. The particle size distribution within these ranges in not usually of sufficient significance to warrant any particular attention.

The chemical composition and polymeric structure of the bead should be such that they will not crush in actual operation in the well. They must be solid; insoluble in oil and water; be stable at bottom hole temperatures ranging up to, for example, 250° F.; be inert, both chemically and physically, to well fluids; and should have a specific gravity within the range of 1.1 to 1.5. In this latter connection, beads having a specific gravity substantially greater than 1.5 may tend to settle out in the lighter weight drilling muds in the event that circulation ceases. The heavier beads will also tend to settle out in the mud pits.

The plastic beads should be in the shape of substantially perfect spheres. It is believed that the spherical shape is important in providing the torque reducing properties of the beads, thus when two metal surfaces tend to rub against each other, as a drill pipe against a casing or against a hard shale, the round spheres existing between such surfaces are thought to act in the nature of ball bearings to reduce the contact between the hard surfaces. Examination of returned mud cake particles under magnification has shown that the beads appear to be aprtially imbedded in the surface of the mud cake leaving exosed a semi-spherical surface for contact with the drill string. Observation of this type of filter cake would lead one to believe that there exists many hundreds of these tiny protuberances of beads for each foot of bore hole.

Examination of "gumbo" shale returns has revealed the cuttings to be partially coated with beads. This leads one to believe, and evidence has been noted, that the beads tend to prevent such shale form balling up bits and stabilizers.

It has also been found that the use of the new and improved method using beads as aforesaid reduces drill pipe and casing wear especially in high angle directional wells by preventing metal to metal contact by the spherical beads. Such beads form a layer or sheath between such metals to thereby reduce friction.

In this latter connection, one directional well was being drilled with a downhole turbo-drill, and , in normal operation, it took two days to make fifteen feet of hole. However, when four pounds per barrel of these plastic beads were added, the drilling rate increased to 15 feet per hour.

In like manner, it has been found that the addition of such plastic beads, which will not melt under high temperatures, is useful in improving wireline operations which must be performed downhole, such as well logging, by enabling the logging tool to slide on the surfaces, provided by the various plastic spheres. Further, the addition of these spheres reduces "wireline drag" both in cased well bores and open well bores.

Applicant further discovered that the use of such beads in a well bore may be further aided with other mud lubricants, such as vegetable oil, such that the beads are suspended in vegetable oil and circulated in the well bore mixed with the drilling mud to further provide the improved properties stated hereinabove.

As a further example of applicant's use, the following examples have been disclosed by applicant as showing the new, useful and unobvious properties of applicant's invention.

EXAMPLE ONE

A drilling operator who was drilling an oil well, had "high torque and drag problems" on an offshore well and called for assistance.

The well being drilled was a 37° directional well having several offsets or doglegs. The well was a 9 ⅝ inches hole being drilled at 11,200 feet with 4,000 feet of 10¾ inches surface casing set. The measured total depth of the well was to be 13,400 feet and the torque had already reached 850 amps on a conventional torque gauge. The torque was such that the operaor was barely turning or rotating the drill pipe. Plastic beads were added to the mud which was pumped through the drill pipe and reached the casing whereupon the torque immediately dropped to 600-650 amps and the roatry speed increased 20 revolutions per minute. The well was drilled the remaining 2,000 feet to completion using the plastic beads.

EXAMPLE TWO

The smae drilling operator in another well hadapproximately 13,000 feet of casing set and arragements had already been made to displace the present mud with an oil base mud because the torque and drag conditions were thought to be too severe for the subject plastic beads to provide the needed reduction in torque. The system was "slug" treated with five percent by volume of the drilling mud with plastic beads and 300 barrels of mud. As soon as the bead laden mud reached the annulus of the well bore, the torque began to drop and the penetration rate of the drilling string incresed by fifty percent. The well was treated to completion at 18,000 feet with the subject beads and upon completion, the mud system contained 1¾ percent by volume of the beads in relation to the drilling mud.

EXAMPLE THREE

The same drilling operator was drilling a well in South Louisiana with an excessive torque problem relative to rotation of the drill string downhole. This was a directional well which demanded a high rotary revolution per minute (rmp) in order to maintain the direction desired. The torque was being indicated as 650-750 amps on the torque gauge with 180 rmp rotary speed. The depth of the well at that time was 8,000 feet and the casing was set for 3,300 feet. Plastic beads were added at 1 ½ percent by volume of the mud system and the torque dropped immediately to 550-600 amps. In this well, excessive "balling" or build up of shales and clays on the stabilizers and drill collars was also eliminated by the subject beads and the well was successfully completed.

EXAMPLE FOUR

An oil company had a well being drilled in South Louisiana, with extreme torque and drag problems relative to the drill string and drill bit. In this instance, the rotary table would actually stop turning while in high gear. In addition, the drill pipe rubbers would also have to be replaced after each "trip" with the drill bit. An "intermediate" string of casing was set to 9,000 feet at attempt to help to eliminate the torque problem. The drilling operator went in the hole with 4¼ inch drill pipe and could not turn the pipe. The operator pulled out of the hole and replaced the 4¼ inch pipe with 3½ inch pipe but the torque was 750 amps and was twisting the drill pipe and the possibility of twisting the drill in two existed. Diesel, graphite and other popular torque reducers had been added with no improvement or with no reduction of torque and drag on the drill string. Plastic beads were added at two percent per volume of the drilling mud and the torque dropped to 600-625 amps as indicated on the torque indicator and the well was drilled to completion.

In the foregoing examples, the plastic beads were a copolymer of divinyl benzene and styrene, were of a mesh ranging from 10 to 100 and were spherical in shape throughout.

What is claimed is:

1. The method of drilling a well comprising rotating a drill string to cut a bore hole into the earth, circulating a drilling mud down through the drill strings and thence up through the annulus between the drill string and the wall of the hole, observing the torque required to rotate the drill string and, when such torque becomes undesirably high, adding sufficient solid plastic beads to reduce the torque, said beads being smooth-surface spheres with a screen size within the range of 10 to 100 mesh but sufficiently small to pass through any shale shaker being used in the drilling operation, said spheres being made of a plastic material having a specific gravity within the range of 1.1 to 1.5 and being insoluable in hydrocarbons and water and further having physical properties such that there is no substantial crushing of the beads during the drilling operation.

2. The method of claim 1, wherein the spheres have a screen size within the range of 40 to 60 mesh.

3. The method of claim 1, wherein the amount of beads added is at least 4 pounds per barrel.

4. The method of claim 3, wherein the spheres have a screen size within the range of 40 to 60 mesh.

5. The method of claim 1, wherein the beads are made from a copolymer of divinyl benzene and styrene.

6. The method of drilling a well comprising rotating a drill string to cut a bore hole in the earth while using a drilling mud, observing the torque required to rotate the drill string and adding solid plastic beads to the drilling mud in an amount sufficient to reduce such torque and to form a sheath on the wall of the bore hole with the beads embedded therein to thereby so reduce such friction, said beads being smooth-surfaced spheres with a screen size range of from 10 to 100 mesh but sufficiently small to pass through any shale shaker being used in the drilling operation, said spheres being made of a plastic material (i) having a specific gravity within the range of 1.1 to 1.5, (ii) being stable under well conditions and (iii) having physical properties such that there is no substantial crushing of the beads during the drilling operation.

7. The method of claim 6, wherein the spheres have a screen size within the range of 40 to 60 mesh and the amount added to the drilling fluid is at least 4 pounds per barrel.

8. The method of claim 7, wherein the beads are made from a copolymer of divinyl benzene and styrene.

9. The method of drilling a well comprising rotating a drill string to cut a bore hole into the earth, circulating a typical drilling mud through the drill string and thence up through the annulus between the drill string and the wall of the hole, observing the torque required to rotate the drill string and when such torque becomes undesirably high, adding 4 to 10 pounds per barrel of solid plastic beads through a mud hopper and mixing them with the typical drilling mud and circulating the resulting mixture through the drill pipe, out the bit, and up the bore hole annulus thereby reducing the torque required to turn the drill string, said beads being round spheres with a screen size within the range of 10 to 100 mesh, the mesh size being determined by the mesh size of the rig shaker so that the beads will pass through the shaker screen and remain in the drilling mud to be recirculated, the point being to keep the beads in the drilling for recirculating.

* * * * *